United States Patent
Arcuri

[19]

[11] Patent Number: 5,842,541
[45] Date of Patent: Dec. 1, 1998

[54] OBSERVATION PLATFORM

[76] Inventor: Natale Arcuri, 540 Perth Avenue, Toronto Ontario, Canada, M6N 2W7

[21] Appl. No.: 794,648

[22] Filed: Feb. 3, 1997

[30] Foreign Application Priority Data

Mar. 19, 1996 [CA] Canada .................................. 2172093

[51] Int. Cl.$^6$ ....................................................... A45F 3/00
[52] U.S. Cl. ............................................ 182/187; 108/152
[58] Field of Search ..................................... 182/187, 188, 182/135, 136, 116, 20; 108/152

[56] References Cited

U.S. PATENT DOCUMENTS

| | | | |
|---|---|---|---|
| 3,116,808 | 1/1964 | Riley | 182/187 |
| 3,730,294 | 5/1973 | Thurmond | 182/187 |
| 4,120,379 | 10/1978 | Carter . | |
| 4,411,335 | 10/1983 | Forrester . | |
| 4,474,265 | 10/1984 | Shinkle . | |
| 4,493,395 | 1/1985 | Rittenhouse . | |
| 4,813,441 | 3/1989 | Kepley | 182/187 |
| 4,953,662 | 9/1990 | Porter | 182/187 |
| 5,186,276 | 2/1993 | Craig | 182/187 |
| 5,279,390 | 1/1994 | Phillips . | |
| 5,285,868 | 2/1994 | Amacker . | |
| 5,297,656 | 3/1994 | Amacker . | |
| 5,363,941 | 11/1994 | Richard . | |

FOREIGN PATENT DOCUMENTS 104354  10/1926  Austria .

*Primary Examiner*—Alvin C. Chin-Shue

[57] ABSTRACT

A portable collapsible platform having a platform, with a mounting edge, a support frame swingably mounted to the mounting edge of the platform and being swingable between a more or less nested portable position closely adjacent the platform, and an extended more or less vertical position, attachments for attaching the support frame to a structure above the ground, flexible strain elements extending between the support frame and the platform to hold the platform, when it is extended, generally horizontal, and, teeth on the mounting edge of the platform, for engaging the structure.

2 Claims, 1 Drawing Sheet

U.S. Patent Dec. 1, 1998 5,842,541
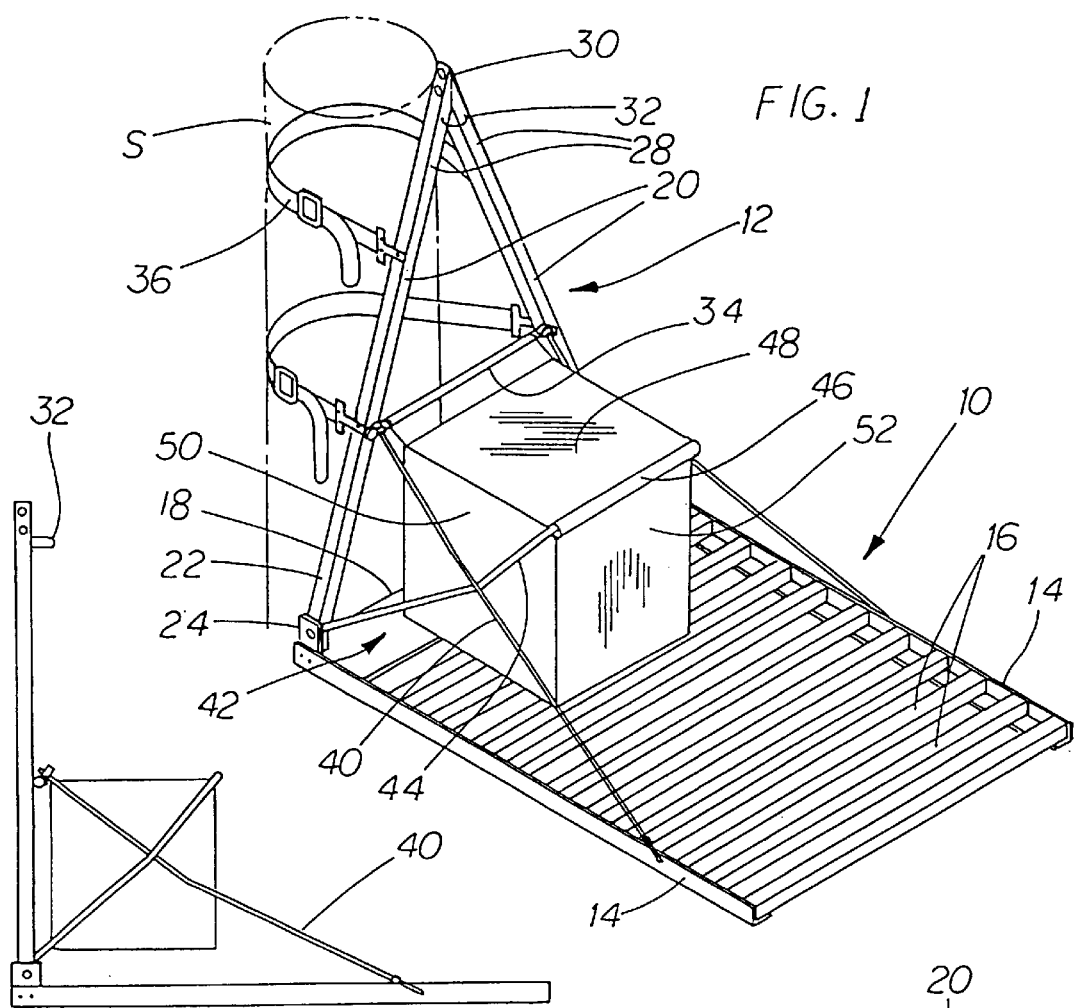
FIG. 1
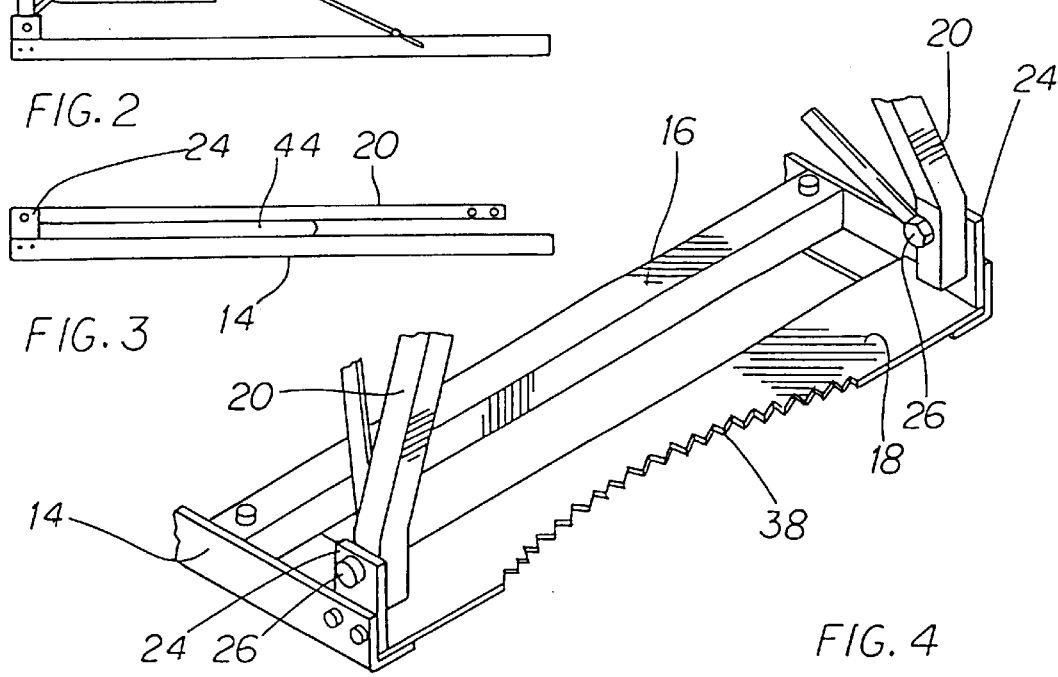
FIG. 2
FIG. 3
FIG. 4

OBSERVATION PLATFORM

FIELD OF THE INVENTION

The invention relates to a portable collapsible observation platform, and in particular, to such a platform which can be erected at various positions in a tree or on a post.

BACKGROUND OF THE INVENTION

The provision of an observation platform in wooded areas is desirable for various purposes such as bird watching, hunting, and the like. Permanent platforms have been available which can be permanently erected in a position in a tree, but generally speaking they are bulky and cumbersome, and cannot readily be moved from place to place. Platforms are also required for working at an elevation such as up a post or on the side of a structure, or indoors in some cases.

Portable platforms such as have been proposed in the past have suffered from numerous disadvantages. In many cases, they are poorly designed and will not support a great deal of weight. In other cases, movement on the platform will cause the platform to swing uncontrollably, causing a person to fall.

For the sake of simplicity, in this text all such different above ground locations will be referred to by the generic term "structure", which is intended to include every type of elevated location to which the platform can be attached.

BRIEF SUMMARY OF THE INVENTION

It is, therefore, with a view to overcoming these various disadvantages that the invention provides a portable collapsible platform comprising a generally planar platform, having an upper and underside, and a mounting edge and a free edge, a support frame swingably mounted to said support edge of said platform and being swingable between a more or less nested portable position closely adjacent the platform, and an extended more or less vertical support position, attachment means for attaching said support frame to structure located above the ground, generally acute angled strain elements extending between said support frame and said platform whereby to hold said platform and said frame when extended in a generally normal relation with said platform generally horizontal, and, structure engaging teeth means on said mounting edge of said platform, for engaging said post.

The invention also provides a foldable and nestable seat. The seat can comprise a sub-frame of generally triangular shape having two angled side portions attached to said platform, and a junction portion extending between said side portions remote from said platform, and a flexible seat adapted to extend from said support frame to said junction portion, when extended, said seat providing a secure seat for a person.

The invention also provides that the support frame is of triangular shape having two side portions having lower and upper ends, the lower ends being connected to opposite ends of the mounting edge of the platform and the upper ends being joined together and having a transverse bar portion extending transversely between them more or less in the form of a letter A.

The flexible seat may be connected between the transverse bar portion, and the junction portion of the seating frame.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a perspective illustration of a portable collapsible platform illustrating the features of the invention;

FIG. 2 is a side elevational view of the platform of FIG. 1, shown erected;

FIG. 3 is a side elevational view corresponding to FIG. 2 showing the platform collapsed and nested ready for carrying, and, FIG. 4 is an enlarged detail of the mounting edge of the platform portion and showing the teeth.

DESCRIPTION OF A SPECIFIC EMBODIMENT

The various features of the invention are illustrated in the drawings, which are shown here by way of example only and without limitation. In FIG. 1 it will be seen that the platform there is shown as having a platform portion indicated generally as 10, and a support A-frame portion indicated generally as 12. The planar portion 10 consists of side frames 14 of linear L shaped angle metal parallel to one another and spaced apart cross members 16, all preferably formed of lightweight metal and has a mounting edge plate 18 extending from one side frame to the other. The support A-frame is also formed of light weight metal and comprises two linear side frame bar members 20—20, having lower and upper ends, the lower ends 22 being attached to flanges 24 on either side of the platform, on opposite ends of the mounting edge 18 of the platform.

The upper ends 28 of the side frames 20 are angled inward and connected together as at 30, and preferably in this case incorporate suspension means such as a U-bolt 32.

A transverse cross bar 34 extends between the side frames 20 making the shape of a letter A.

The support frame can be swung on bolts 26 relative to the platform as shown in FIGS. 2 and 3.

Attachment means in the form of straps 36 are connected to the side frames, and may be of sufficient length so that they can be wrapped around a structure S such as a post or tree trunk at a suitable height and hold the platform in position. The mounting edge plate 18 has teeth 38 for engaging the post or tree trunk or other structure, to prevent the platform from swinging after it has been attached. The teeth 38 of mounting edge plate are formed in a generally arcuate shape so as to conform to the curvature as a structure S such as a tree trunk or the like.

Strain elements are provided in the form of flexible wires 40 extending between the ends of the transverse cross bar 34, and a point midway along the side frames 20—20 of the platform.

In this way, when the platform is extended, it is securely held in a more or less level position relative to the support frame.

In order to provide a seat, there is advantageously provided a seating frame 42, having two side members 44, the lower ends of which are connected to bolts 26, connecting through flanges 24 at opposite ends of mounting edge plate 18 of the platform 10.

The two side members 44 are more or less angled towards one another and meet at a junction portion 46. A seat 48 is preferably formed of flexible material such as canvas and is secured by loops, connected respectively to the transverse cross-bar 34 and the junction portion 46. A person can thus sit on the seat and will be securely supported.

If desired, a container 50 can be fitted beneath the seat. The container 50 will also be formed of flexible material such as canvas, and may have an end opening or flap 52 which may be closed by any suitable means such as a slide fastener (not shown).

The operation of the invention is self evident from the foregoing description. It is light weight and it may readily be carried about in folded or collapsed portable condition. It may easily be opened up and erected in woodlands, for observation, or for example on a post where it is desired to do work or at any other location where structure as defined herein is to be found. The platform when folded is compact and can be stored or placed in a vehicle, and can easily be moved around.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A portable collapsible seating storage platform and comprising;

a generally planar platform, having an upper and underside;

a mounting edge extending along and defining one edge of said platform and extending from one side to the other of said platform;

a free edge of said platform spaced from said mounting edge plate, said platform providing a planar surface extending from said mounting edge plate to said free edge;

a pair of L shaped angle bars extending parallel to one another along either side of said platform and extending alongside each end of said mounting edge plate;

attachment flanges secured to said angle bars at each end of said mounting edge plate a support frame comprising two linear frame bars defining lower and upper ends, said lower ends being swingably mounted to said attachment flanges at each end of said mounting edge plate of said platform said linear frame bars extending from said attachment flanges and being angled towards one another to form a generally A shaped frame, said linear frame bars being joined together at their upper ends at the apex of said A shape and being swingable between a substantially nested position closely adjacent the platform, and an extended substantially vertical position at right angles to said platform for lying directly against the surface of a structure means;

attachment means for attaching said support frame lying against the surface of the structure means above the ground;

a cross bar extending between said linear frame bars intermediate their lower and upper ends;

a seat frame of generally truncated triangular shape having two angled side frame portions attached to said attachment flanges on said mounting edge plate and angled towards one another;

a junction bar portion of said frame extending between said side frame portions remote from said attachment flanges;

a flexible seat secured between said cross bar of said support frame and said junction bar portion of said seat frame and providing secure seating for a person;

generally acute angled flexible strain elements secured to each end of said cross bar of said support frame and being secured to said parallel L shaped angle bars of said platform intermediate said mounting edge plate and said free edge of said platform whereby to hold said platform, when extended in a generally normal relation to said support frame, with said platform generally horizontal, and, structure engaging teeth means forming a concave arcuate curve in said mounting edge plate of said platform and extending rearwardly of said platform, for engaging said structure.

2. A platform as claimed in claim 1 and including collapsible container means secured to said seat.

* * * * *